(12) United States Patent
Sbandi et al.

(10) Patent No.: US 11,336,675 B2
(45) Date of Patent: May 17, 2022

(54) CYBER RESILIENCE CHAOS STRESS TESTING

(71) Applicant: Bank of America Corporation, Charlotte, NC (US)

(72) Inventors: Michael J. Sbandi, Charlotte, NC (US); Marisa Kamer, Naperville, IL (US); Sanjay Lohar, Charlotte, NC (US); Margaret M. Brewer, Charlotte, NC (US); Anna E. Ganse, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 466 days.

(21) Appl. No.: 16/576,988

(22) Filed: Sep. 20, 2019

(65) Prior Publication Data
US 2021/0092143 A1    Mar. 25, 2021

(51) Int. Cl.
| | |
|---|---|
| *H04L 29/00* | (2006.01) |
| *H04L 29/06* | (2006.01) |
| *G06F 11/36* | (2006.01) |
| *G06N 20/00* | (2019.01) |

(52) U.S. Cl.
CPC ...... *H04L 63/1433* (2013.01); *G06F 11/3612* (2013.01); *G06N 20/00* (2019.01)

(58) Field of Classification Search
CPC .. H04L 63/1433; G06N 20/00; G06F 11/3612
See application file for complete search history.

(56) References Cited

U.S. PATENT DOCUMENTS

| | | | |
|---|---|---|---|
| 8,819,442 B1 * | 8/2014 | Gehrig | H04L 63/1433 713/180 |
| 8,856,936 B2 | 10/2014 | Datta Ray et al. | |
| 9,294,998 B2 | 3/2016 | McDiarmid et al. | |
| 9,319,420 B1 | 4/2016 | Franke et al. | |
| 9,426,169 B2 | 8/2016 | Zandani | |

(Continued)

OTHER PUBLICATIONS

Cybersecurity Delimmas; Technology, Policy and Incentives; Summary of Discussuions at the 2014 Raymond and Beverly Sackler U.S-U.K Scientific Forum; [online], [retrived on Sep. 5, 2019] Retrieved from http://www.nasonline.org/programs/scientific-forum/sackler-forum-2014-report.pdf.

*Primary Examiner* — Don G Zhao
(74) *Attorney, Agent, or Firm* — Banner & Witcoff, Ltd.

(57) ABSTRACT

A plurality of communicatively coupled, networked assets may be threatened or attacked by a cybersecurity attack. The operational resiliency of the computer network determines whether the cybersecurity attack leads to a shutdown of one or more assets, or even the entire computer network. Machines and processes are disclosed to improve operational cybersecurity resiliency of software on the computer network. Machine learning is used to identify potential vulnerabilities from a vulnerability database. Chaos stress testing using a machine learning algorithm can be performed on software to exploit the vulnerabilities. A blast radius can be set to minimize any potential negative side effects of the testing. Software can be remediated to account for responses to the testing by reconfiguring to prevent exploitation of the vulnerabilities. A financial impact of the exploited vulnerabilities can be calculated and reports can be generated.

18 Claims, 10 Drawing Sheets

(56) References Cited

U.S. PATENT DOCUMENTS

| | | |
|---|---|---|
| 9,521,160 B2 | 12/2016 | Ng et al. |
| 9,699,209 B2 | 7/2017 | Ng et al. |
| 9,749,343 B2 | 8/2017 | Watters et al. |
| 9,749,344 B2 | 8/2017 | Watters et al. |
| 9,930,061 B2 | 3/2018 | Zandani |
| 9,998,481 B2 | 6/2018 | Temm |
| 10,050,990 B2 | 8/2018 | Ng et al. |
| 10,063,583 B2 | 8/2018 | Watters et al. |
| 2014/0259095 A1* | 9/2014 | Bryant ................. H04L 63/20 726/1 |
| 2016/0034838 A1 | 2/2016 | Gembicki |
| 2016/0119373 A1* | 4/2016 | Fausto ............. H04L 63/1433 726/25 |
| 2017/0308701 A1* | 10/2017 | Nandha Premnath ................... H04W 12/128 |
| 2018/0359276 A1 | 12/2018 | Ng et al. |
| 2019/0253427 A1* | 8/2019 | Kling ................. G06F 3/0622 |
| 2020/0034935 A1* | 1/2020 | Chavda ............... G06Q 40/08 |
| 2021/0049185 A1* | 2/2021 | Kaitha ................ G06F 16/275 |
| 2021/0064758 A1* | 3/2021 | Zettel, II ............. G06F 21/577 |
| 2021/0075814 A1* | 3/2021 | Bulut ................. H04L 63/102 |
| 2022/0012814 A1* | 1/2022 | Crabtree ............. G06Q 10/10 |
| 2022/0051127 A1* | 2/2022 | Jacobson ............ G06K 9/6256 |

\* cited by examiner

CYBER RESILIENCE CHAOS STRESS TESTING

TECHNICAL FIELD OF DISCLOSURE

The present disclosure relates to processes and machines for probing the operational resilience of a computer network and/or components thereof under the threat of cybersecurity attacks by using different types of machine learning to exploit known vulnerabilities, launching attacks using chaos engineering, gathering data on the effects of the attacks and system responses thereto, finding patterns in vulnerability types to recognize other potentially vulnerable systems outside of the scope of the initial test for subsequent testing, controlling a blast radius for each test to minimize fallout, calculating financial impacts relating to the potential vulnerabilities, and/or providing reports for use with potential remediation in order to mitigate cybersecurity threats and improve the operational resiliency of the computer network or components thereof.

BACKGROUND

The National Academy of Sciences (NAS) reported in 2014: the introduction of the Internet and the World Wide Web has revolutionized the ways we work and access information, such that we are steadily more reliant on networked, digital technology. A single global digital infrastructure has been created as a platform, and as a result, cybersecurity is a growing concern for organizations. Massive pools of personal information and other data is being shared and stored online, creating a vulnerability to attack and exploitation by bad actors.

A July 2018 discussion paper by The Bank of England advocated for building the UK financial sector's operational resilience. The paper promoted a paradigm shift that encouraged financial institutions to consider cyber threat as a primary risk factor and assume that operational disruptions will occur. The paper suggested that the concept of operational resilience is an evolution of current business continuity and disaster recovery response, because it emphasizes the potential impact of cyberattacks and accounts for operational processes and services. The paper advocated a business-services approach to operational resilience, while recommending that testing/planning address the probabilistic nature of severe-but-plausible scenarios.

Currently, firms test their cyber defense systems through minimally invasive methods that seldom mimic the impact of a real-world cyberattack. Industry standards for these tests include simulated penetration attacks by internal Red Teams, simulated phishing campaigns, and network perimeter scanning. Firms already conduct automated ethical hacking, scanning and traditional penetration testing. However, operational resilience in response to a cyberattack is becoming increasingly important to companies in view of the fact that service interruptions, unauthorized access to accounts, and breaches of data, lead to customers to doubt whether reliable and safe services can be delivered. Beyond simply measuring operational resilience, companies need the ability to automatically test their cybersecurity defenses as realistically as possible to ensure actual resilience.

The disclosure addresses one or more of the shortcomings in the industry, thus improving the operational cybersecurity resiliency of software on a computer network.

SUMMARY

In light of the foregoing background, the following presents a simplified summary of the present disclosure in order to provide a basic understanding of various aspects of the disclosure. This summary is not limiting with respect to the exemplary aspects of the inventions described herein and is not an extensive overview of the disclosure. It is not intended to identify key or critical elements of the disclosure or to delineate the scope of the disclosure. Instead, as would be understood by a personal of ordinary skill in the art, the following summary merely presents some concepts of the disclosure in a simplified form as a prelude to the more detailed description provided below.

In one general aspect of this disclosure, a system of one or more computer executable software and data, computer machines and components thereof, networks, and/or network equipment can be configured to perform particular operations or actions individually, collectively, or in a distributed manner to cause the system or components thereof to perform cybersecurity resiliency testing, remediation reconfigurations of one or more components, calculate financial costs for remediations or the failure to remediate, and/or provide reports on various aspects of the foregoing.

As used throughout this disclosure, computer-executable "software and data" can include one or more: algorithms, applications (e.g., scanning applications), a blast radius, chaos engineering and stress test tools, databases (e.g., vulnerability databases including the NIST National Vulnerability Database), datasets (e.g., historical datasets), drivers, data structures, firmware, graphical user interfaces, instructions, machine learning (i.e., supervised, semi-supervised, reinforcement, and unsupervised), middleware, modules, objects, operating systems, processes, programs, scripts, tools (e.g., for stress testing and chaos stress testing), and utilities. The computer-executable software and data is stored in tangible, non-volatile, computer-readable memory (locally or in network-attached storage) and can operate autonomously, on-demand, on a schedule, and/or spontaneously. "Computer machines" can include one or more: general-purpose or special-purpose network-accessible personal computers, desktop computers, laptop or notebook computers, distributed systems, workstations, portable electronic devices, printers, scanners, facsimile machines, multifunction devices, and/or servers having one or more microprocessors for executing or accessing the computer-executable software and data. Computer machines also includes all hardware and components typically contained therein. The "servers" can be virtual or physical, on-premise or remote, and can include one or more: application servers, cybersecurity servers, test servers, and/or web servers for executing, accessing, and/or storing the computer-executable software and data. Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of any of the same. Networks also include associated "network equipment" such as access points, ethernet adaptors (physical and wireless), firewalls, hubs, modems, routers, and/or switches located inside the network and/or on its periphery, as well as software executing on any of the foregoing.

In a general aspect of the disclosure, computer-executable software on a server can be used to improve operational cybersecurity resiliency of software on a computer network. A dataset is loaded that contains vulnerability information from a vulnerability database. Vulnerabilities can be determined by using a machine learning algorithm on the vulnerability dataset. The software is stress tested to try to exploit one or more vulnerabilities. The stress testing can include selecting one or more of the vulnerabilities to be tested. A blast radius can be confirmed or selected to minimize potential negative side effects from the stress testing. Chaos stress testing can be performed on the software with respect to one or more vulnerabilities by utilizing a machine learning algorithm based a historical dataset. One or more responses to the chaos stress testing can be identified. The software can be remediated to account for the response to the chaos stress test by configuring the software to prevent exploitation of one or more of the vulnerabilities. Financial calculations can be performed to identify the actual or potential impact of the exploited vulnerabilities, the costs to remediate the software to account for the potential vulnerabilities, and/or the cost of the failure to remediate the software. Reports regarding the cybersecurity resiliency of the system or components thereof as was as the financial calculations can be provided.

In one aspect of the disclosure, an automated real-time process for a virtual on-premise scanning application can be used to improve operational cybersecurity resiliency of software on a computer network. A vulnerability dataset is loaded that contains vulnerability information from a vulnerability database accessible from a computer network. The vulnerability database could be located inside the network or be remote, such as the NIST National Vulnerability Database, which is online and accessible via the Internet. Vulnerabilities can be determined by using an unsupervised machine learning algorithm on the vulnerability dataset. The software is stress tested to try to exploit one or more vulnerabilities. The stress testing can include selecting one or more of the vulnerabilities to be tested. The vulnerabilities could be selected randomly, based on a prioritization of the severity of the vulnerability, or other desired criteria. A blast radius can be confirmed or selected to minimize any potential negative side effects from the stress testing. Chaos stress testing can be performed on the software with respect to one or more vulnerabilities by utilizing a semi-supervised machine learning algorithm based a historical dataset. One or more responses to the chaos stress testing can be identified. The software can be remediated to account for the response to the chaos stress test by configuring the software to prevent exploitation of one or more of the vulnerabilities. If desired, financial impact(s) of the exploited vulnerabilities can be calculated. The calculation could identify the cost associated with the remediation and/or the cost associated with not implementing the remediation. Also, if desired, report(s) on the cybersecurity resilience of the software can be generated. The report can include information regarding the financial calculation. The report can also identify one or more of the vulnerabilities tested, the response to the chaos stress test, the remediation performed on the software, and/or recommended enhancements to improve the operational cybersecurity resiliency of the software.

In another aspect of the disclosure, a process for an application on a test server on a network can be used to improve operational cybersecurity resiliency of software on the network. A vulnerability dataset can be loaded from the network, either locally or via the Internet, that contains vulnerability information from a vulnerability database. Vulnerabilities can be determined by using a first machine learning algorithm on the vulnerability dataset. The software can be stress tested to try to exploit the vulnerabilities. The stress test can select at least one of the vulnerabilities to test. The software can be tested by chaos stress testing by utilizing a second machine learning algorithm based on a historical dataset. One or more responses to the chaos stress test can be identified. The software can be remediated based on one or more responses to the chaos stress testing. The remediation can configure the software to prevent exploitation of the vulnerabilities. One or more reports on the cybersecurity resilience of the software could be generated.

In various aspects of the disclosure, a blast radius for the chaos stress test can be confirmed or selected. The blast radius can be set to minimize negative side effects from the chaos stress test.

In a further aspect of the disclosure, a cybersecurity machine can be provided to test and/or improve the operational cybersecurity resiliency of software on a computer network. A virtual on-premise scanning application can be coupled to the network that contains a tangible, non-transitory, computer-readable medium storing computer-executable instructions and a computer processor for executing said instructions stored thereon. A vulnerability database can be coupled to or accessible from the network. Vulnerability instructions can be provided on the computer-readable medium to extract a vulnerability dataset from the vulnerability database. Unsupervised machine learning instructions on the computer-readable medium can be used to determine vulnerabilities based on the vulnerability dataset. Randomization instructions on the computer-readable medium can be utilized to select at least one of the vulnerabilities to attempt to exploit in the software. Chaos stress testing instructions on the computer-readable medium can be used to attack the first software based on one or more of the selected vulnerabilities. The chaos stress test can use semi-supervised machine learning instructions based a historical dataset. Blast radius instructions on the computer-readable medium can be used to minimize negative side effects from chaos stress testing. Monitoring instructions on the computer-readable medium can be provided to identify a response to the chaos stress testing. Remediation instructions on the computer-readable medium can be utilized to configure the software to prevent exploitation of one or more of the vulnerabilities.

In other aspects of the disclosure, pattern learning instructions on the computer-readable medium can be used to find one or more patterns in the vulnerability dataset in order to identify at-risk computer machines and/or system(s) outside a scope of the chaos stress testing. The at-risk equipment could then be tested at a later time using various aspects of this disclosure.

In some aspects of this disclosure, a financial impact of the exploited vulnerabilities can be calculated In some aspects of this disclosure, report(s) on various aspects of the cybersecurity resiliency tests or test results could be provided.

In a further aspect of this disclosure, a network-attached cybersecurity machine for improving operational cybersecurity resiliency is provided. The machine can include a virtual on-premise scanning application on a tangible, non-transitory computer-readable medium storing computer-executable instructions and a computer processor for executing said instructions stored thereon. A vulnerability database is coupled to the network. Vulnerability instructions are on the computer-readable medium for extracting a vulnerability dataset from the vulnerability database. Unsupervised machine learning instructions on the computer-readable medium are used to determine vulnerabilities based on the vulnerability dataset. Randomization instructions on the computer-readable medium are used to select at least one of the vulnerabilities to attempt to exploit in the software. Chaos stress testing instructions attack the software based on one or more of the selected vulnerabilities. The chaos stress testing instructions use semi-supervised machine learning instructions based a historical dataset. The chaos stress testing instructions, semi-supervised machine learning instructions, and historical datasets are stored on the computer-readable medium. Blast radius instructions on the computer-readable medium are used to minimize negative side effects from the chaos stress testing. Monitoring instructions on the computer-readable medium are used to identify a response to the chaos stress testing. Remediation instructions on the computer-readable medium are used to configure the software to prevent exploitation of the vulnerabilities. Pattern learning instructions on the computer-readable medium are used to find one or more patterns in said vulnerability dataset and thereby identify at-risk system(s) outside a scope of the initial chaos stress testing. Calculation instructions on the computer-readable medium can calculate financial impacts regarding the vulnerabilities. Reporting instructions can provide information relating to cybersecurity, financial matters, and/or remediation.

In another aspect of the disclosure, chaos stress testing instructions test software on an at-risk system identified based on pattern recognition. Remediation instructions can configure the software to prevent exploitation of the vulnerabilities on the at-risk system.

In yet another aspect of the disclosure, a process or machine can improve operational resiliency of a computer network by testing a system's security defenses by assessing current open vulnerabilities through machine learning processes. The systems can then launch scheduled, on-demand, and/or spontaneous attacks to try to exploit those specific vulnerabilities in order to gather data on the effects of the attacks, the effectiveness of the response and failover. The system also could recommend enhancements to improve the system's resiliency. The attacks can be developed and launched using machine learning in order to facilitate the most effective attacks based, for example, on historical evidence or other parameters, against specific aspects of the system or its components, or against specific instances of an application's production environment in order to test the overall efficacy of the response effort.

In various aspects of the disclosure, algorithms can be programmed according to the risk appetite of a chaos engineer supervising the attack. This dynamic setting of a risk appetite can define a blast radius to limit potential negative impacts in the event of a successful exploitation of a vulnerability by limiting or obviating system downtime, system impact, interruption of application services or resources, or perceived user impact in a production environment. For example, depending on the risk appetite, particular attacks may stop once an indication is given that the attack would be successful whereas others will follow through with the exploitation.

In various aspects of this disclosure machine learning algorithm(s) can train to recognize open vulnerabilities on specific computer software, computer machines, and/or networks within a system by interacting with the NIST National Vulnerability Database or internal vulnerabilities database(s). Attacks can then be designed and/or implemented to test or exploit those vulnerabilities. The system could employ, simultaneously or otherwise, machine learning to find patterns in the vulnerability types to recognize other potentially vulnerable systems and/or system interactions outside of the scope of the initial test. Such patterns could then be used for subsequent testing of the system, components or aspects thereof, and/or system interactions. The system could be designed or implemented to minimize the blast radius of simulated attacks and subsequent fall out from testing to ensure that negative effects do not expand to other servers and cause service outages and/or unintended service interruptions.

In some aspects of this disclosure, results from testing can provide valuable data on the effectiveness of current controls, which would allow companies to effectively test and measure operational resilience in real-time. If current controls are insufficient, then test results can serve as evidence for why the issue should be remediated. The test results can also provide control enhancement recommendations that could have effectively stopped the attack, at multiple stages throughout the cyber kill chain. Test results also could be used to evaluate the financial impact should a company decide not to implement one or more recommended control enhancements.

Another general aspect of this disclosure includes process(es), which can be automated and/or run at scheduled intervals, on-demand, and/or in real-time, on a cybersecurity server to improve operational cybersecurity resiliency of software on a computer network. A vulnerability dataset including vulnerability information can be loaded from one or more vulnerability databases loaded from local memory on the server, in database(s) inside a firewall that is accessible on the network, and/or from database(s) outside a firewall such as, for example, the NIST National Vulnerability Database, which is accessible via the Internet. Based on information from the vulnerability database(s), potential vulnerabilities can be identified by using a machine learning algorithm, such as a semi-supervised algorithm, on the vulnerability dataset. Stress testing can be used on the software in question to try to exploit one or more of the identified vulnerabilities, either concurrently or simultaneously. As part of the stress test, one or more of the vulnerabilities can be selected for investigation. The vulnerability selection(s) can be performed randomly or based on priorities such as, for example, the level of threat posed by the vulnerabilities. A blast radius can be set, if desired, to minimize one or more negative side effects that may result from the stress test. Chaos stress testing of the software with respect to one or more of the vulnerabilities can be performed by utilizing one or more machine learning algorithms, such as supervised machine learning algorithms, based on historical datasets. One or more responses to the chaos stress testing can be identified by the process(es). The software being tested can be remediated based on response to the chaos stress testing. The remediation could configure the software, automatically or otherwise, to prevent exploitation of one or more of the vulnerabilities.

In some aspects of this disclosure, report(s) on the cybersecurity resiliency of the system could be provided after performing the chaos stress testing. The report(s) could provide information regarding identification of which vulnerabilities were tested, other vulnerabilities recommended for testing in the future, how the vulnerability selected for testing was chosen, the response(s) to the chaos stress testing, remediation performed on the software in response to the chaos stress test, suggested future remediation steps to be considered, recommended enhancements to improve the operational cybersecurity resiliency of the software, and/or other at-risk systems to test in the future.

Implementations of various aspects of this disclosure regarding chaos stress testing and machine learning can vary depending on the preferences of chaos engineers, all of which would be within the knowledge of a person of ordinary skill in the art and could be implemented by such a person without undue experimentation by using custom and/or commercially available software. Although specific types of chaos stress testing and machine learning have been suggested for certain aspects of the disclosure, one type can be substitute for any other type without departing from the spirit of the invention contained in this disclosure and all are considered within the scope of the invention and claims.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

All computer processes and systems have limits, and possible points of failure. By injecting a system with something that has the potential to disrupt it, weaknesses and vulnerabilities can be identified, and steps can be taken to make it more cyber resilient. Chaos engineering and stress testing in accordance with this disclosure recognizes the potential points of failure and vulnerabilities. Hence, the processes and machines of the present disclosure attempt to break various aspects of the systems on purpose before they fail on their own. By attempting to trigger failures intentionally in a controlled way, systems can be confirmed to appropriately handle the failures or can be identified for remediation in order to avoid the potential failure and thus cause a potential outage. Preferably, chaos stress tests are selected and implemented in a way to minimize the impact on potential users. Hence, a blast radius is selected or confirmed to limit the potential impact. It is important to note that chaos engineering and stress tests in accordance with this disclosure does not mean randomly breaking things or simply random failure testing. Instead, the goal is to perform thoughtful, planned, and scientific experiments using machine learning and historical datasets.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
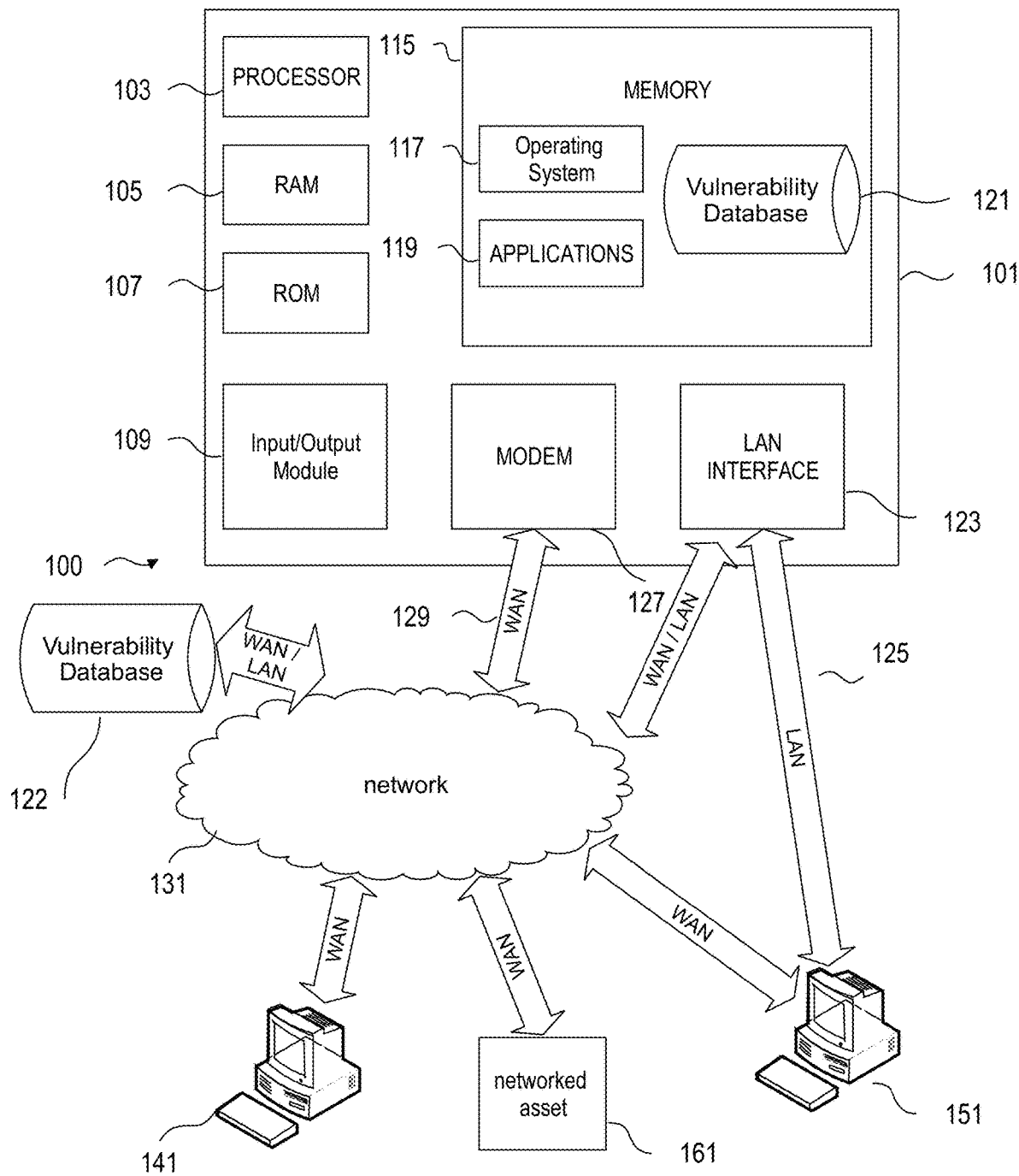
FIG. 1 illustrates a schematic diagram of a digital computing environment in which certain aspects of the present disclosure may be implemented.

FIG. 1 illustrates a system 100 block diagram of a specific programmed computer machine 101 (e.g., a server) that may be used according to an illustrative embodiment of the disclosure. A server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions and to access data. For example, memory 115 may store software used by the server 101, such as an operating system 117, application programs 119, and an associated database 121, such as a vulnerability database. Alternatively, a vulnerability database may be accessible from a network. An example of an online vulnerability database 122 that can be used in accordance with this disclosure is the NIST National Vulnerability Database, which is the U.S. government repository of standards based vulnerability management data represented using the Security Content Automation Protocol (SCAP). The data in the National Vulnerability Database enables automation of vulnerability management, security measurement, and compliance. The National Vulnerability Database includes databases of security checklist references, security-related software flaws, misconfigurations, product names, and impact metrics. Some or all of server 101 computer-executable instructions may be embodied in hardware or firmware (not shown).

The server 101 may operate in a networked environment supporting connections to one or more remote computers, such as terminals 141 and 151 and networked asset 161. The terminals 141 and 151 may be personal computers or servers that include many or all of the elements described above relative to the server 101. The networked asset 161 may be similar to terminals 141 and 151, or may be a database server device, an application server device, a web server device, a firewall device, or any other computerized asset electrically connected to the network 131. In one example, networked asset 161 may be a software application operating on a terminal device 151; the software application may be a smartphone application or may be a web browser-based application. Computing device 101, terminals 141 or 151, and/or networked asset 161 may also be mobile terminals including various other components, such as a battery, speaker, and antennas (not shown).

The network connections depicted in FIG. 1 include LAN(s) and WAN(s), such as 125 and 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the network 131 (e.g., Internet). The server 101 may also use a LAN interface 123 to access a WAN or the Internet. It will be appreciated that the network connections shown are illustrative and other means of establishing a communications link between the computers may be used. The existence of any of various protocols such as TCP/IP, Ethernet, FTP, HTTP and the like is presumed.

The disclosure is operational with numerous other general-purpose or special-purpose computing system environments, configurations, machines, and processes, as broadly and non-exhaustively defined in the summary of the invention with respect to computer-executable software and data, computer machines, and networks.

Figure 2:
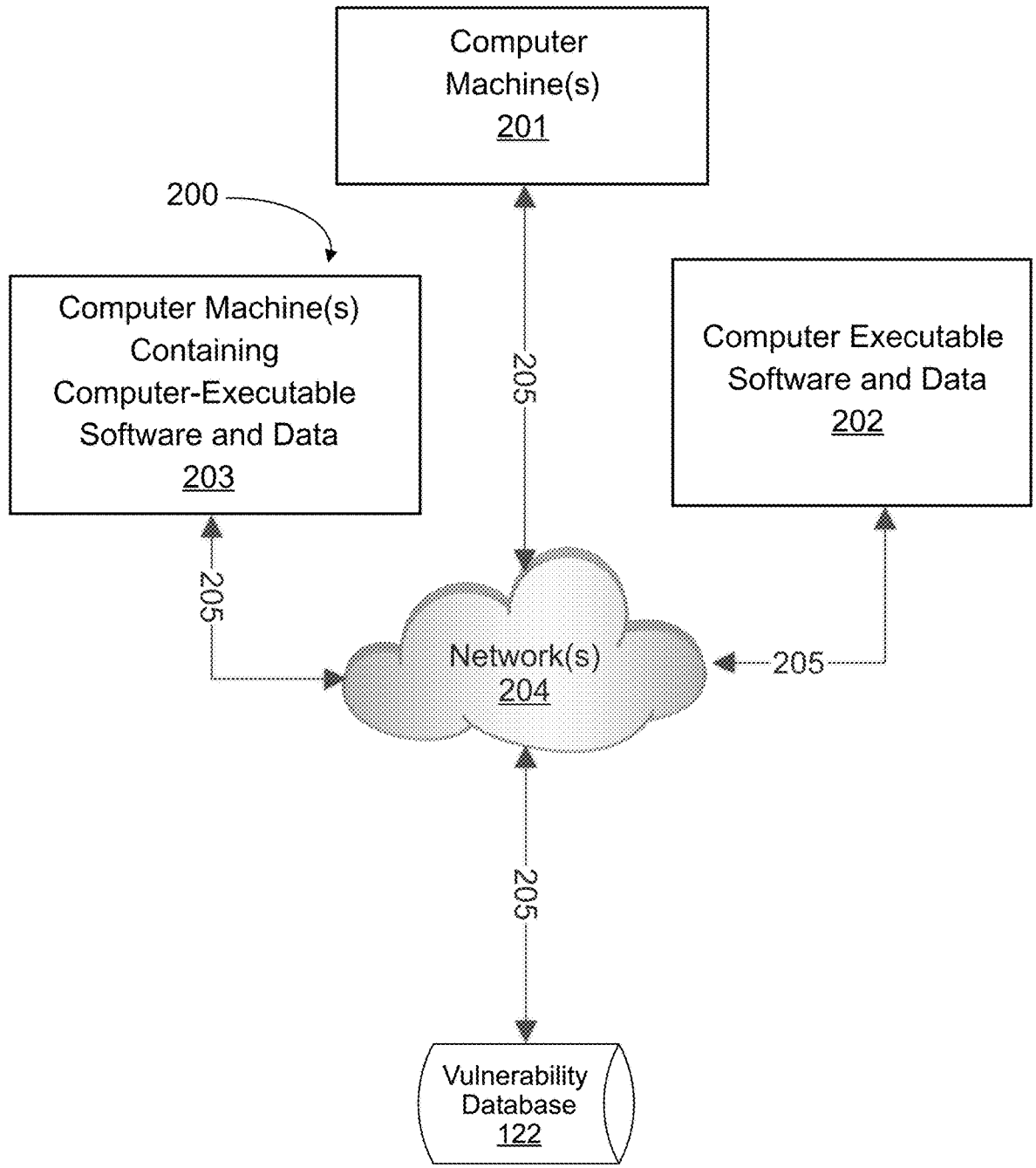
FIG. 2 is an illustrative block diagram of computer machine(s), data, and network(s) that may be used to implement the processes and functions of certain embodiments of the present disclosure.

Referring to FIG. 2, an illustrative system 200 for implementing methods according to the present disclosure is shown. As illustrated, system 200 may include one or more computer machines 201 and 203. Computer software and data may reside in a network location 202 accessible through the network 204 or may reside locally on one or more of the computer machine(s) containing executable software and data 203. Remote data can also be outside of the network such as the NIST National Vulnerability Database on the Internet.

Computer machine(s) such as 201 and 203 are coupled to the network(s) via communication link(s) 205. This allows computer machines to interact with, test, and access one another as well as all internal and peripheral network equipment.

Figure 3:
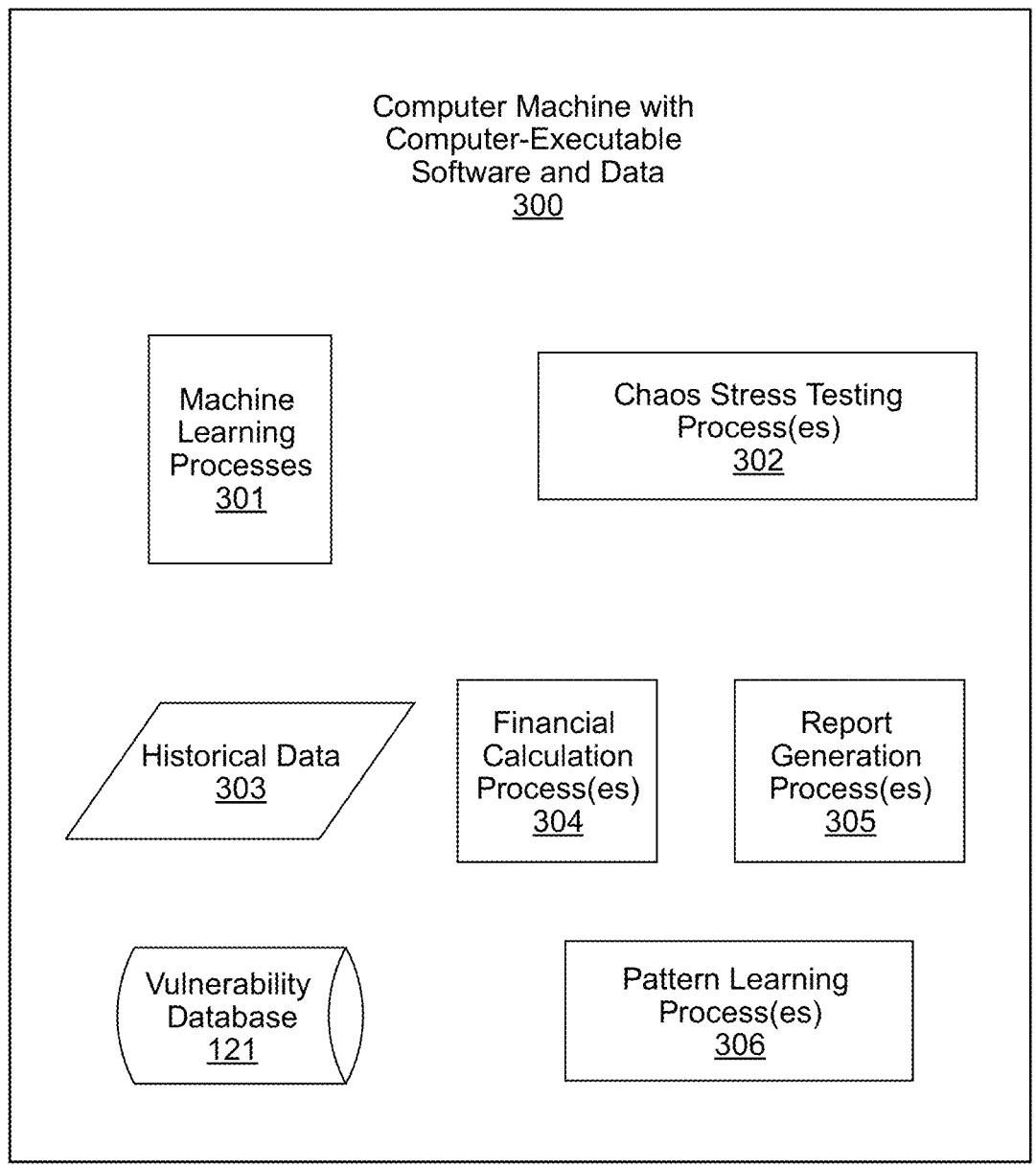
FIG. 3 illustrates exemplary computer-readable memory storing various computer software and data used in accordance with aspects of the disclosure.

FIG. 3 illustrates exemplary computer-readable memory 300 storing various computer software and data used in accordance with aspects of the disclosure. This includes machine learning process(es) 301, chaos stress testing process(es) 302, historical data 303, financial calculation process(es) 304, report generation process(es) 305, pattern learning instructions 306, and vulnerability data 121 stored on the computer-readable memory 300 and is executable or accessed by microprocessors in computer machines such as 201 and 203. Alternatively, remote vulnerability data 122 may be accessed by the computer machines via the Internet through network(s).

Figure 4:
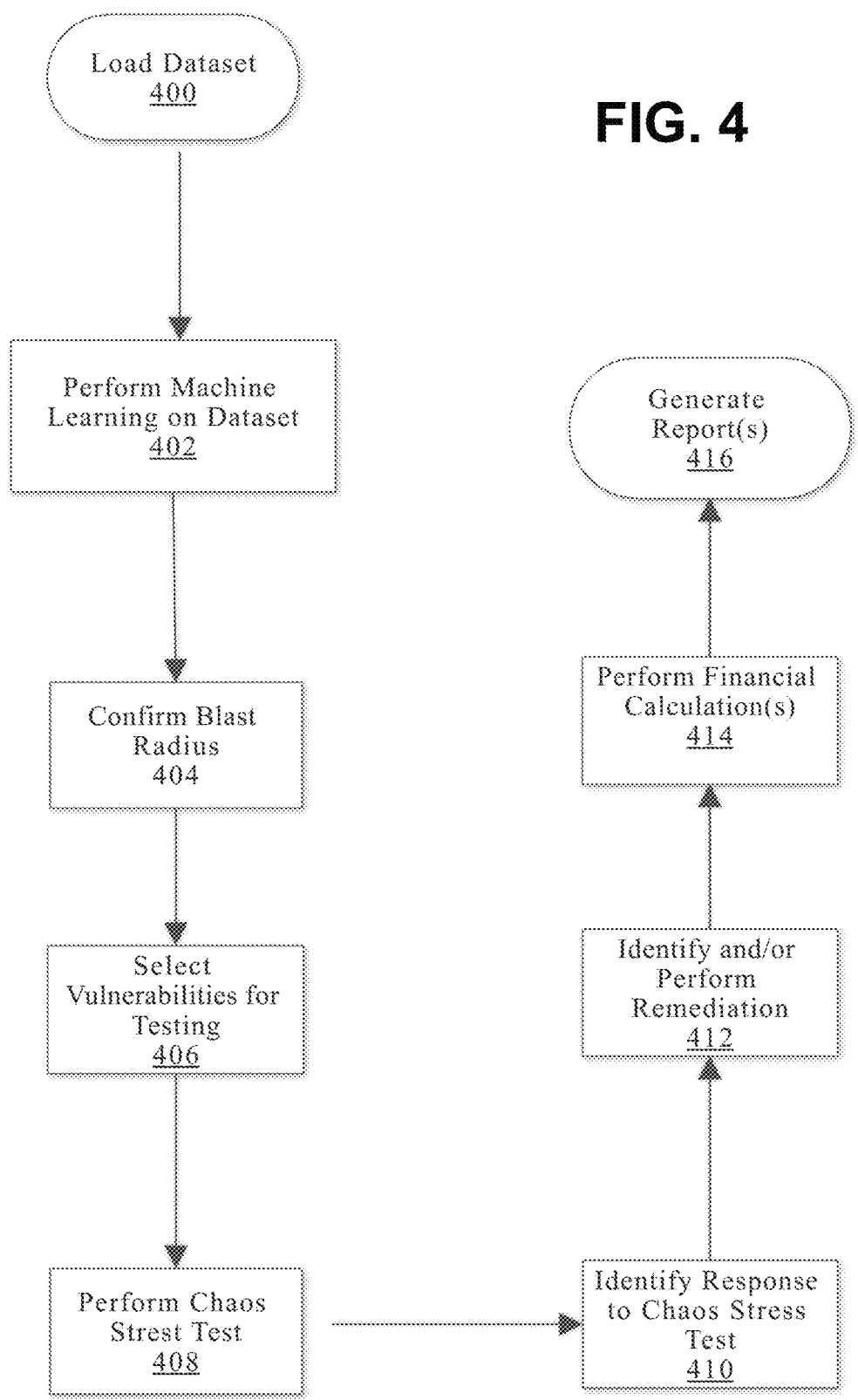
FIG. 4 is an illustrative flowchart of a method performed in accordance with one or more implementations to improve operational cybersecurity resiliency of software on a network.

FIG. 4 is an illustrative flowchart of a method performed in accordance with one or more implementations to improve operational cybersecurity resiliency of software on a network. The operations of the method are intended to be illustrative. In some implementations, the method may be accomplished with one or more additional operations not described, and/or without one or more of the operations discussed. Additionally, the order in which the operations of method are illustrated in the accompanying figures and described below is not intended to be limiting.

In Step 400 in FIG. 4, a dataset is loaded by a computer machine. The dataset contains vulnerability information from a vulnerability database. The vulnerability database may be stored locally or may be remote.

In Step 402, computer software on the computer machine uses a machine learning algorithm on the vulnerability dataset. Based on information from the vulnerability database(s), potential vulnerabilities can be identified by the machine learning algorithm.

Machine Learning as used in this disclosure generally refers to automating and improving the learning process of computers based on their experiences or historical datasets without being actually programmed (i.e. without any or with minimal human assistance). The process starts with inputting good quality data and then training the machines or algorithms by building machine learning models using the data and different algorithms. The choice of algorithms depends on the types of vulnerabilities in the vulnerability databases and the historical datasets that are available at the time of the chaos stress test.

Machine learning implementations as used herein are classified into three major categories, depending on the nature of the learning signal or response available to a learning system. The first is supervised learning. This machine learning algorithm consists of a target or outcome or dependent variable which is predicted from a given set of predictor or independent variables. Using these sets of variables, a function is generated that maps input variables to desired output variables. The training process continues until the model achieves a desired level of accuracy on the training data. Examples of supervised learning include: regression, decision tree, random forest, KNN, logistic regression, etc.

The second is unsupervised learning. In this machine learning algorithm, there is no target or outcome or dependent variable to predict or estimate. It is used for clustering a given data set into different groups. Apriori algorithm and K-means are some of the examples of unsupervised learning.

The third is semi-supervised or reinforcement learning. Using this algorithm, the machine is trained to make specific decisions. Here, the algorithm trains itself continually by using trial and error methods and feedback methods. This machine learns from past experiences and tries to capture the best possible knowledge to make accurate decisions. Markov Decision Process is an example of semi-supervised machine learning.

In Step 402, it is preferable that an unsupervised machine learning algorithm be used on the vulnerability dataset in order to identify the potential vulnerabilities; however, other machine learning algorithms could be used.

In Step 404, a blast radius can be confirmed or selected to minimize potential negative side effects from the stress testing so they do not expand to other computer machines or software and cause service outages and/or unintended service interruptions.

In Step 406, one or more of the vulnerabilities are selected for testing. The vulnerabilities can be selected randomly, based on a prioritization of the severity of the vulnerability, or other desired criteria.

In Step 408, chaos stress testing is performed on the software with respect to one or more vulnerabilities by utilizing a machine learning algorithm based a historical dataset. Preferably, a semi-supervised machine learning algorithm would be used for Step 408; however, other machine learning algorithms could be used. Some examples of what might be probed in a chaos stress test include:

rebooting or halt the host operating system, which would allow monitoring of how the system would react when losing one or more cluster machines; changing a host's system time, which could test the system's capability to adjust to daylight saving time and other time-related events; and simulating attacks that kill processes, which can simulate application or dependency crashes.

In Step 410, one or more responses to the chaos stress testing are identified.

In Step 412, potential remediation steps to account for the response to the chaos stress test are identified. The remediation may be performed automatically by reconfiguring the software to prevent exploitation of one or more of the vulnerabilities. As an example, an open port on a router could be identified and automatically closed. Alternatively, the recommended remediation can be logged or reported to a chaos engineer for later automatic or manual remediation.

In Step 414, financial calculations, if desired, can be performed to identify the actual or potential impact of the exploited vulnerabilities, the costs to remediate the software to account for the potential vulnerabilities, and/or the cost of the failure to remediate the software.

In Step 416, reports regarding the cybersecurity resiliency of the system or components thereof, the remediation performed or recommended, and/or the financial calculations can be generated.

Machine learning can also be used to recognize patterns in the vulnerability dataset (not shown) in order to identify at-risk computer machines and/or system(s) outside a scope of the chaos stress testing. The at-risk equipment could then be tested at a later time using various aspects of this disclosure.

Figure 5:
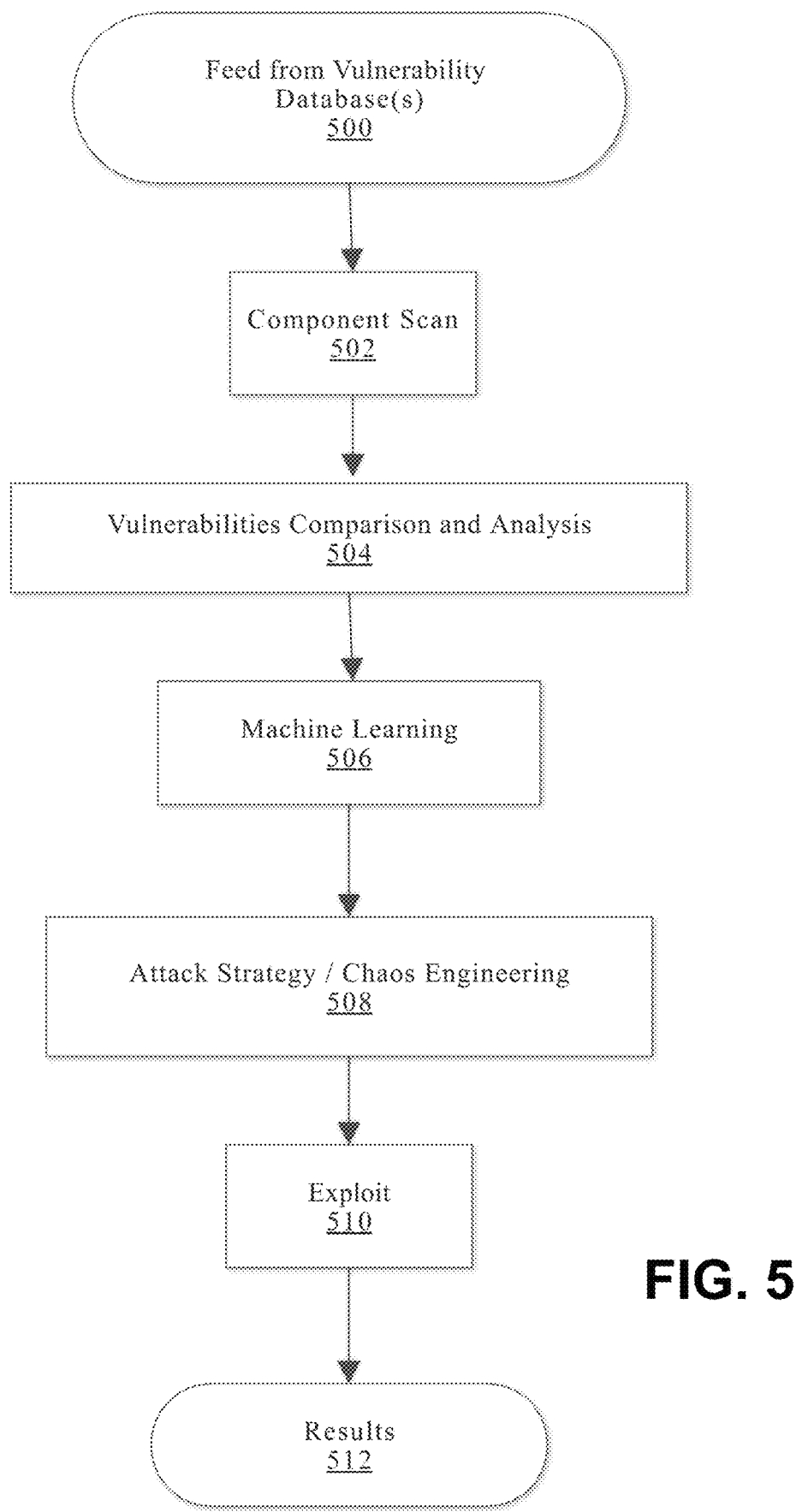
FIG. 5 is an illustrative generic process flowchart showing sample processes that may be implemented to perform chaos stress testing.

FIG. 5 is an illustrative generic process flow showing sample processes that may be implemented to perform chaos stress testing. In Step 500, vulnerability information can be received from one or more vulnerability databases. The information can be received continuously or on demand. In Step 502, one or more components across the system can be scanned to identify vulnerabilities. In Step 504, information on open vulnerabilities can be compiled along with potential exploits from one or more exploit libraries. In Step 506, machine learning is used to identify one or more other vulnerable systems across an enterprise, servers, or network. In Step 508, an attack strategy or chaos engineering can be implemented based on criteria defined by, for example, a chaos engineer or programmer, and an appropriate blast radius can be selected or confirmed. In Step 510, exploits can be launched against the identified systems to attempt to compromise them. In Step 512, a report can be generated based on pre-defined or desired criteria that can quantify the dollar value impact of a successful attack.

As a more specific example of the chaos stress sample of FIG. 5, in Step 500, a real time feed from the NIST National Vulnerability Database can provide vulnerability information continuously. In Step 502, a vulnerability could be identified on an application running Red Hat Enterprise Linux 8—CVE-2019-12384 jackson-databind. In Step 504, the vulnerability is recognized and an assessment on the application is performed to determine exploitability, for example: accepts JSON files=Yes; uses polymorphic type handling; gadgets in the Java classpath, and active gadget blocking=No.

In Step 506, a scan and/or analysis of other applications can be performed to identify other applications that are running the same vulnerable version of the Red Hat Enterprise Linux operating system. In Step 508, a chaos engineer or system programmer can determine the blast radius that will attempt to be exploited and the degree to which the exploit can metastasize. For example, the blast radius could identify the number of instances or servers that could be affected. Sample degrees of exploitation can include simple denial(s) of service, server-side request forger(ies), and/or remote code execution(s).

In Step 510, one or more possible exploits against the vulnerable applications can be performed until the intended goal is achieved such as, for example, a jRuby script on top of a java machine to load java classes into the classpath subdirectory, the script configures Jackson to meet requirements, deserialization and serialization of a polymorphic Jackson object is passed as JSON, and/or the object creates a connection to a remote database allowing denial of service or a server side forgery.

In Step 512, based on the success of the attack and the predetermined blast radius, the system can then quantify the potential loss (e.g., in dollars) should a threat actor be able to launch a similarly successful attack and sends the report to business stakeholders for review and decision making.

Figure 6:
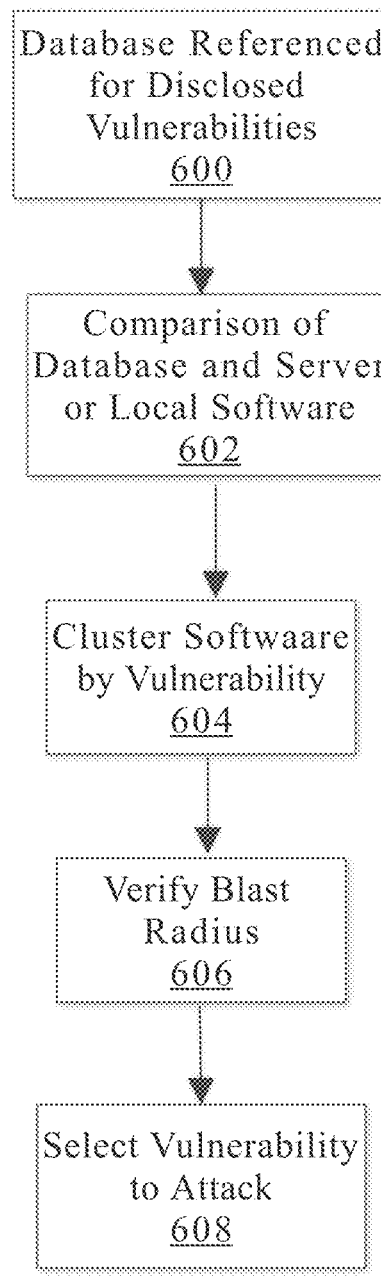
FIG. 6 is an illustrative flowchart showing a sample unsupervised machine learning process that may be performed in accordance with one or more implementations of this disclosure.

FIG. 6 is an illustrative flowchart showing a sample unsupervised machine learning process that may be performed in accordance with one or more implementations of this disclosure. Software on a server can be analyzed by the system. In Step 600, a vulnerability database can be referenced for disclosed vulnerabilities. In Step 602, a comparison of a vulnerability database and the software can be performed. In Step 604, software can be clustered by vulnerability. In Step 606, a blast radius can be verified. In Step 608, on or more vulnerabilities can be selected for attack. Preferably, the vulnerabilities are selected randomly based on chaos engineering theory.

Figure 7:
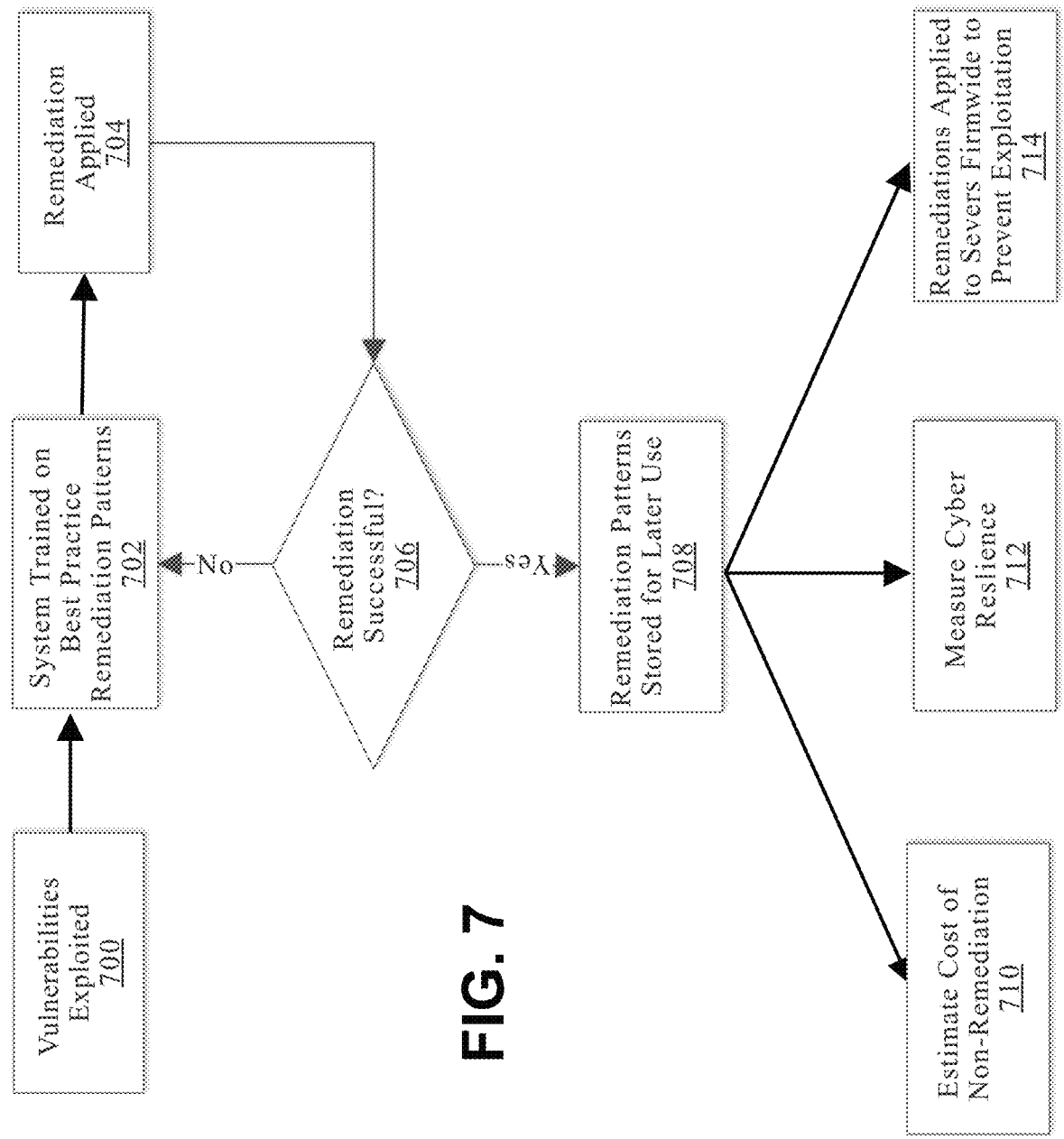
FIG. 7 is an illustrative flowchart showing a sample semi-supervised machine learning process that may be performed in accordance with one or more implementations of this disclosure.

FIG. 7 is an illustrative flowchart showing a sample semi-supervised machine learning process that may be performed in accordance with one or more implementations of this disclosure. In Step 700, one or more vulnerabilities are exploited. In Step 702, the system can be trained on best practice remediation patterns. In Step 704, one or more remediations are applied. In Step 706, an evaluation is performed to determine whether the attempted remediation was successful. If it was not successful, the feedback can be provided to retrain the system and repeat the process at Step 702. If it was successful, the remediation pattern(s) can be stored for later use in Step 708. Thereafter, the cost of non-remediation can be calculated in Step 710. The cyber resilience can be measured in Step 712. And, successful remediations can be applied to systems, applications, and servers firmwide to prevent exploitation of the vulnerabilities.

Figure 8:
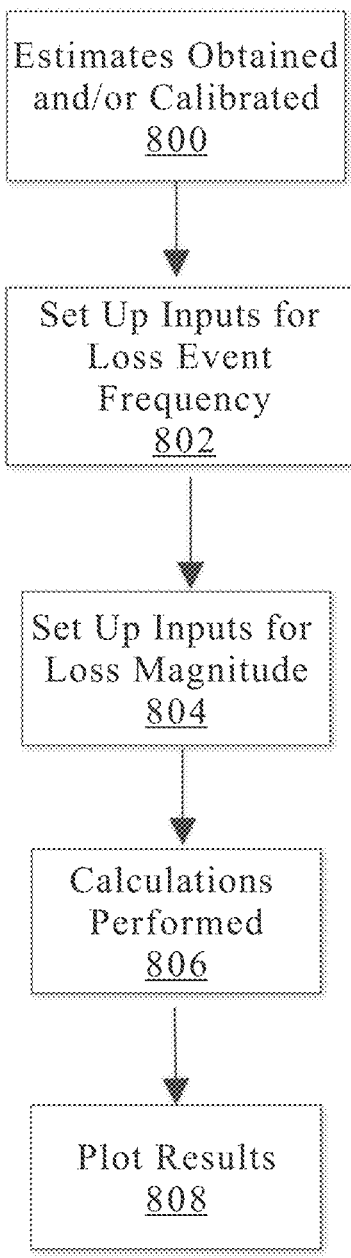
FIG. 8 is an illustrative flowchart of factor analysis of information risk in accordance with the calculation and report aspects of one or more implementations of this disclosure.
Figure 9:
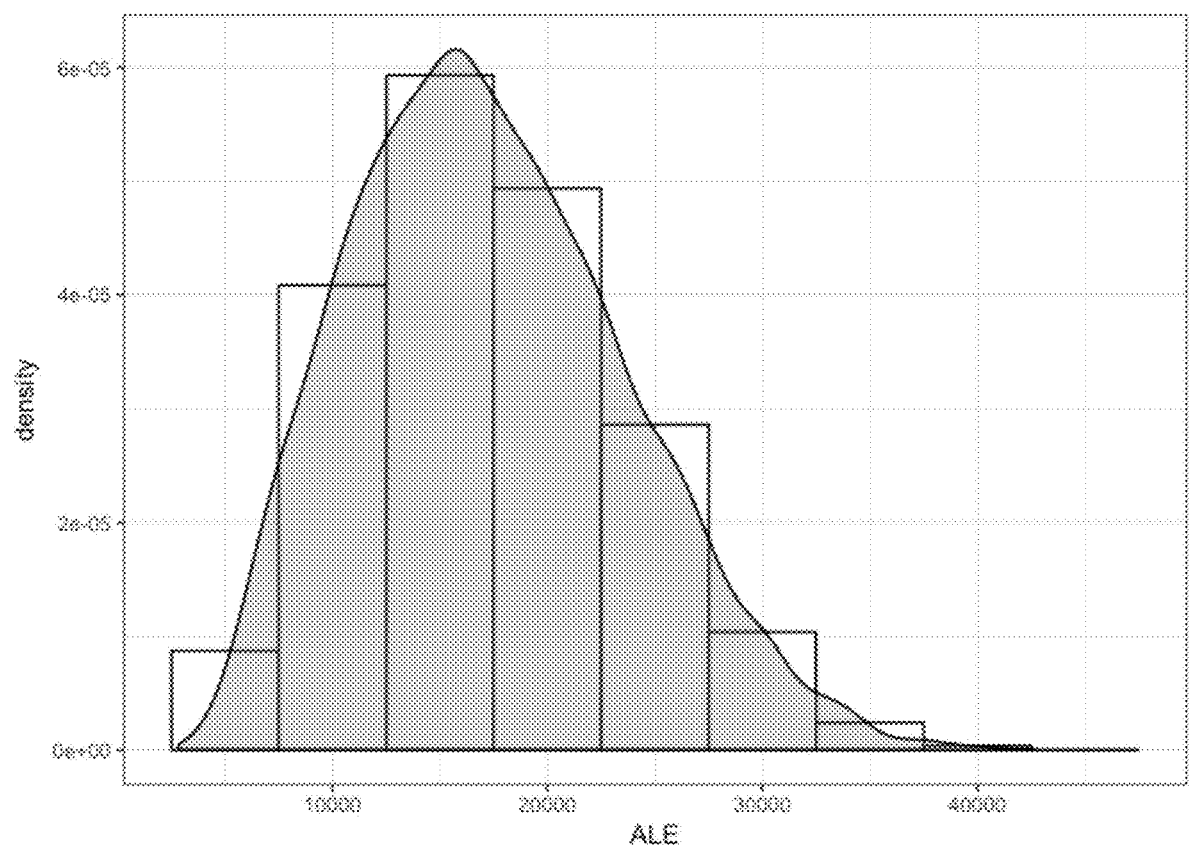
FIG. 9 is a sample histogram visualization that could be provided as part of a report in accordance with one or more implementations of this disclosure.
Figure 10:
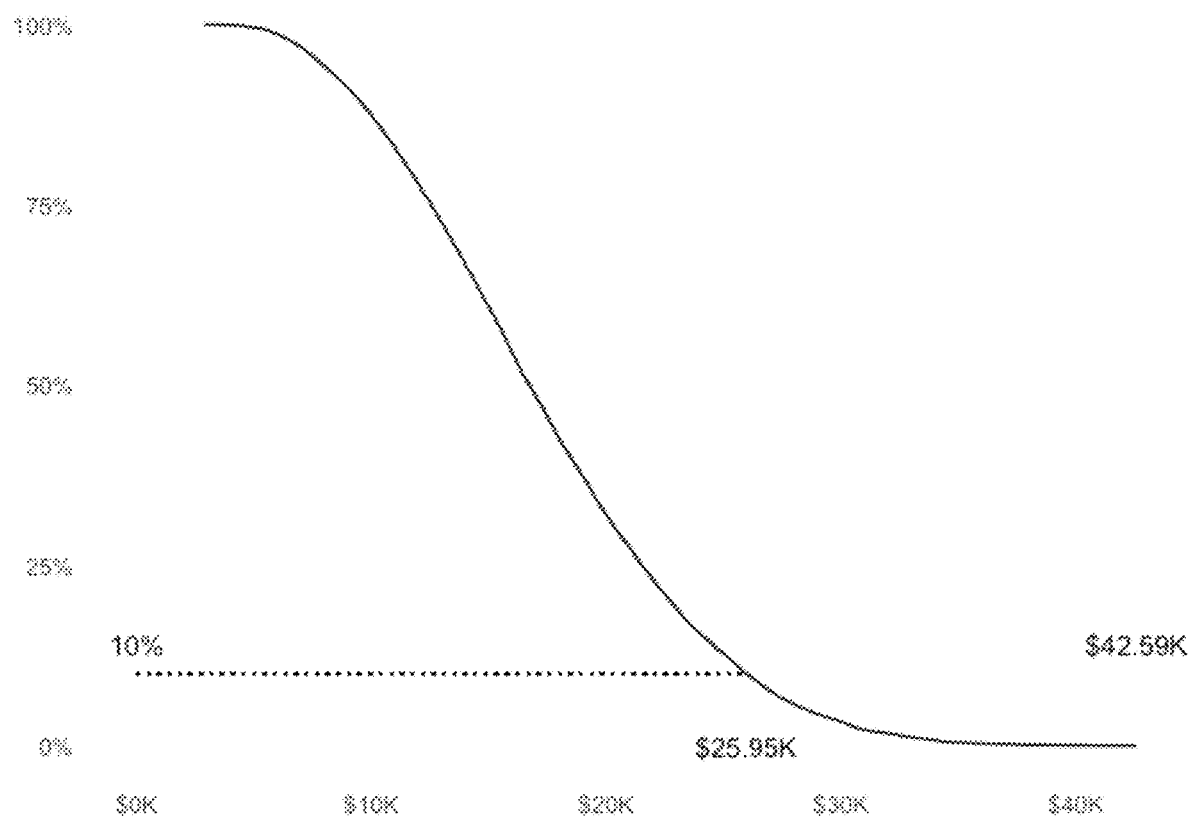
FIG. 10 is a sample loss exceedance curve that could be generated as part of a report in accordance with one or more implementations of this disclosure.

FIG. 8, FIG. 9, and FIG. 10 help illustrate a factor analysis of information risk (FAIR) in accordance with this disclosure. Persons of skill in the art will appreciate that FAIR is the standard value at risk (VaR) framework for cybersecurity and operational risk. The framework provides information risk, cybersecurity and business executives with the standards and best practices to help organizations measure, manage and report on information risk from the business perspective.

Starting with FIG. 8, estimates from subject matter experts can be obtained and/or calibrated in Step 800. Estimates are typically provided as a range of minimum and maximum values. For advanced analysis, the confidence factor can be adjusted to shape the distribution. In Step 802, inputs for a loss event frequency can be set up. If loss event frequency cannot be estimated, a deeper level in the FAIR model can investigated and a loss event frequency can be derived from threat event frequency and vulnerability (susceptibility).

As an example, a loss event frequency can be estimated directly. In this example, it can be estimated that a loss occurs at least twice a year, is most likely to happen four times a year (once per quarter), and at most would occur nine times a year. Hence variables would be set as follows:

```
loss_event_frequency_min <- 2
loss_event_frequency_max <- 9
loss_event_frequency_likely <- 4
```

In Step 804, inputs for loss event frequency could be set up. Losses in FAIR can be divided into primary losses and secondary losses. Another term for this is guaranteed losses and conditional losses. Primary losses are typically where losses are incurred directly by the organization. Secondary losses are typically where losses are caused by actions that secondary stakeholders might take. If a secondary loss always occurs, there is no mathematical reason for categorizing it as a secondary loss.

Losses in FAIR can be divided into 6 forms, to help structure communications and exchanges of information with subject matter experts. All the forms of loss are typically added together, but dividing them in this way helps organize the calculations. The 6 forms of loss in FAIR can be: (a) productivity loss—lost sales, idle employees, (b) response costs—hiring lawyers, forensic investigations, generators, (c) replacement costs, (d) competitive advantage, (e) fines or judgments, (f) reputation damage—examples are uncaptured revenue and increased cost of capital In this example, losses are not calculated separately. For the purposes of the example, it is assumed that each has been considered and a range estimate of loss magnitude has been identified. Hence variables could be set as follows:

```
loss_magnitude_min <- 1000
loss_magnitude_max <- 9000
loss_magnitude_likely <- 4000
```

In Step 806, the calculations are executed. Persons of skill in the art will appreciate that a monte carlo simulation can be used based on a beta-PERT distribution. A confidence level can be set along with a number of runs to be performed. In this example, the default number of runs is 10,000, and a confidence level of 4 is set, which is the default in beta-PERT. The confidence level can be varied to change the shape of the distribution to reflect lower or higher certainty around the most likely value.

```
confidence <- 4 # default in PERT
number_of_runs <- 10000
```

As part of the calculation process, a seed can be set in order to provide repeatable results.
set.seed(88881111)
The simulation for the Loss Event Frequency is run.

```
LEF <- rpert(number_of_runs, loss_event_frequency_min,
  loss_event_frequency_likely,
  loss_event_frequency_max, shape = confidence)
```

The simulation for the Loss Magnitude is run.

```
LM <- rpert(number_of_runs, loss_magnitude_min, loss_magnitude_likely,
  loss_magnitude_max, shape = confidence)
```

The Loss Event Frequency is multiplied by the Loss Magnitude. This can be performed by vector multiplication.

```
annual_loss_exposure <- LEF * LM
crude_ALE <- annual_loss_exposure
```

Simple vector multiplication as implied by the FAIR model assumes that multiple losses in a single year are the same size. Another method is to take each set of loss events in a year and sample from the distribution of loss magnitudes, then sum.

```
ALE <- sapply)LEF, function(e) sum(rpert(e, loss_magnitude_min,
  loss_magnitude_likely, loss_magnitude_max, shape = confidence)))
max_loss <- max(ALE)
min_loss <- min(ALE)
```

Take the 95th percentile for the first result. Value at Risk is $40,123.11. Maximum Loss is $60,447.74. Mean Loss is $19,499.58. Minimum Loss is $3,029.60.

Take the 95th percentile. Value at Risk is $30,648.46. Maximum Loss is $42,587.60. Mean Loss is $17,292.94. Minimum Loss is $2,864.44.

In Step 808, the results can then be plotted to show annual loss exposure. This can be plotted as a histogram as in FIG. 9 or a loss exceedance curve with linear or exponential scales as in FIG. 10.

Code and variables for the histogram plot could be:

```
ale_frame <- data.frame (ALE)
most <- max(ALE)
gg <- ggplot(ale_frame, aes(x = ALE))
gg <- gg + geom_histogram(aes(y = ..density..),
  color="black",
  fill = "white",
  binwidth = 5000)
gg <- geom_density(fill = "steelblue", alpha = 1/3)
gg <- gg + theme_bw( )
gg
```

Code and variables for the loss exceedance curve could be:

```
# calculate the probability of exceedance aka complementary
cumulative probability function
ale_frame <- mutate(ale_frame, prob = 1 - percent_rank(ALE))
# sort the results in ascending order of loss magnitude
ale_frame <- ale_frame[order(ALE),]
g2 <- ggplot(ale_frame, mapping = aes(x = ALE, y = prob))
g2 <- g2 + geom_path( ) + scale_y_continuous(labels = percent)
#g2 <- g2 + geom_hline(yintercept = 0.1, color = "red", size = .5) +
# scale_y_continuous(labels = percent)
g2 <- g2 + scale_x_continuous(labels = format_kdollars) # normal scale
#g2 <- g2 + scale_x_log10(labels = format_kdollars) # logarithmic scale
g2 <- g2 + annotate("text", y = 0.1, x = max (ALE),
  label = format_kdollars(max(ALE)), vjust = -1)
#g2 <- g2 + geom_hline(yintercept = 0.1, lty = "dotted")
#g2 <- g2 + geom_vline(xintercept = max(ale_frame$ALE), lty = "dotted")
g2 <- g2 + annotate("text", y = 0.10, x = 0, label = percent(0.1),
  vjust = -1)
```

```
g2 <- g2 + annotate("text", y = 0, x = quantile(ale_frame$ALE, c(0.90)),
    label = format_kdollars(quantile(ale_frame$ALE, c(0.90))),
    hjust = 0.5)
g2 <- g2 + geom_segment(aes(x = 0, y = 0.1, xend =
quantile(ale_frame$ALE, c(0.90)), yend = 0.1), lty = "dotted")
#    geom_point(data = intersection_xy_df, size = 3)
g2 + theme_few( )
```

In the foregoing example, the reports were not predictions, but rather were a calculation of probabilities. Thus, generated report(s) provide information risk, cybersecurity and business executives with the standards and best practices to help organizations measure, manage and report on information risk from the business perspective.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An automated real-time process for a virtual on-premise scanning application implemented on a computer machine with a processor that executes computer-executable instructions stored on a computer-readable medium to improve operational cybersecurity resiliency of software on a computer network coupled to the computer machine comprising the steps of:
    a) loading, by the processor into the computer-readable medium, a vulnerability dataset comprising vulnerability information from a vulnerability database accessible from the computer network;
    b) determining vulnerabilities by the processor by using an unsupervised machine learning algorithm on the vulnerability dataset;
    c) stress testing, by the processor, the software to try to exploit said vulnerabilities, wherein the stress testing comprises:
        (1) randomly selecting, by the processor, at least one of said vulnerabilities;
        (2) confirming a blast radius, by the processor, to minimize negative side effects from the stress testing;
        (3) chaos stress testing, by the processor, the software with respect to said at least one of said vulnerabilities by utilizing a semi-supervised machine learning algorithm based a historical dataset accessible from the computer network; and
        (4) identifying a response to the chaos stress testing;
    d) remediating, by the processor, the software based on said response to the chaos stress testing, wherein the remediating configures the software to prevent exploitation of said vulnerabilities; and
    e) calculating, by the processor, a financial impact of the vulnerabilities.

2. The automated real-time process of claim 1 wherein the application is executed on a server selected from the group consisting of: an application server, a test server, a web server, and a cybersecurity server.

3. The automated real-time process of claim 2 wherein the chaos stress testing is performed on a plurality of network-attached devices coupled to the network selected from the group consisting of: routers, switches, hubs, firewalls, server operating systems, workstations, databases, desktop computers, printers, and wireless access devices.

4. The automated real-time process of claim 2 wherein the chaos stress testing is performed on the software operating at a perimeter of the network.

5. The automated real-time process of claim 4 wherein the vulnerability database is the NIST National Vulnerability Database.

6. The automated real-time process of claim 1 further comprising the step of generating a report by the processor that identifies:
    a) the randomly selected vulnerabilities;
    b) the response to the chaos stress testing;
    c) the remediating performed on the software based on said response to the chaos stress testing;
    d) at least one recommended enhancement to improve the operational cybersecurity resiliency of the software; and
    e) the financial impact of the vulnerabilities.

7. A process for an application on a test server to improve operational cybersecurity resiliency of software on a computer network, the test server having a processor that executes computer-executable instructions stored on a computer-readable medium, the test server coupled to the network, the process comprising the steps of:
    a) Loading, by the processor into the computer-readable medium, a vulnerability dataset from the network comprising vulnerability information from a vulnerability database;
    b) determining vulnerabilities, by the processor, by using a first machine learning algorithm on the vulnerability dataset;
    c) stress testing, by the processor, the software to try to exploit said vulnerabilities, wherein the stress testing comprises:
        (1) selecting, by the processor at least one of said vulnerabilities;
        (2) confirming a blast radius for the stress testing to minimize negative side effects from the stress testing;
        (3) chaos stress testing, by the processor, the software with respect to said at least one of said vulnerabilities by utilizing a second machine learning algorithm based on a historical dataset; and
        (4) identifying, by the processor, a response to the chaos stress testing;
    d) remediating, by the processor, the software based on said response to the chaos stress testing, wherein the remediating configures the software to prevent exploitation of said vulnerabilities; and
    e) reporting, by the processor, the cybersecurity resilience of the software.

8. The process of claim 7 wherein the first machine learning algorithm is unsupervised.

9. The process of claim 7 wherein the second machine learning algorithm is semi-supervised.

10. The process of claim 7 wherein the selection of said vulnerabilities is random.

11. The process of claim 7 wherein the steps are performed in real-time as the operational cybersecurity resiliency of the software is analyzed.

12. The process of claim 7 wherein the steps are stored as computer-executable instructions in at least one tangible, non-transitory computer-readable medium.

13. The process of claim 12 wherein the vulnerability database is the NIST National Vulnerability Database.

14. A non-transitory computer-readable medium with computer-executable instructions stored thereon executed by a processor on a cybersecurity computing machine to improve operational cybersecurity resiliency of a first software on a network, said cybersecurity computing machine coupled to the network, and said user computing machine coupled to a network, said computer-executable instructions comprising:
   a) vulnerability instructions for the processor to extract a vulnerability dataset from a vulnerability database;
   b) unsupervised machine learning instructions for the processor to determine vulnerabilities based on the vulnerability dataset;
   c) randomization instructions for the processor to select at least one of the vulnerabilities to attempt to exploit in the first software;
   d) chaos stress testing instructions for the processor to attack the first software based on said at least one of the selected vulnerabilities, said chaos stress testing instructions utilizing semi-supervised machine learning instructions based a historical dataset;
   e) blast radius instructions for the processor to minimize negative side effects from the chaos stress testing;
   f) monitoring instructions for the processor to identify a response to the chaos stress testing;
   g) remediation instructions for the processor to configure the first software to prevent exploitation of said vulnerabilities; and
   h) pattern learning instructions for the processor to find a pattern in said vulnerability dataset, said pattern used to identify an at-risk system outside a scope of the chaos stress testing.

15. The non-transitory computer-readable medium of claim 14 wherein said computer-executable instructions further comprise: financial calculation instructions for the processor to calculate a financial impact of the vulnerabilities.

16. The non-transitory computer-readable medium of claim 14 wherein said computer-executable instructions further comprise: reporting instructions for the processor to report cybersecurity resilience of the first software.

17. The non-transitory computer-readable medium of claim 15 wherein said computer-executable instructions further comprise: reporting instructions for the processor to report cybersecurity resilience of the first software.

18. The non-transitory computer-readable medium of claim 17 in which the chaos stress testing is performed on a periphery of the network.

\* \* \* \* \*